United States Patent
Kwon

(10) Patent No.: US 11,648,904 B2
(45) Date of Patent: May 16, 2023

(54) APPARATUS FOR COUPLING AIRBAG MODULE TO STEERING WHEEL

(71) Applicant: HYUNDAI MOBIS CO., LTD., Seoul (KR)

(72) Inventor: Oh Koang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/530,350

(22) Filed: Nov. 18, 2021

(65) Prior Publication Data
US 2023/0067431 A1 Mar. 2, 2023

(30) Foreign Application Priority Data
Aug. 27, 2021 (KR) .................. KR10-2021-0113929

(51) Int. Cl.
*B60R 21/203* (2006.01)
*B60R 21/217* (2011.01)

(52) U.S. Cl.
CPC ........ *B60R 21/2035* (2013.01); *B60R 21/217* (2013.01)

(58) Field of Classification Search
CPC .................... B60R 21/2037; B60R 21/2035
See application file for complete search history.

(56) References Cited

U.S. PATENT DOCUMENTS

| | | | | |
|---|---|---|---|---|
| 11,034,374 B2* | 6/2021 | Banno | ................. | B60R 21/2037 |
| 11,299,118 B2* | 4/2022 | Funk | ................. | B60R 21/2035 |
| 11,305,716 B2* | 4/2022 | Hirota | ................. | B60R 21/2037 |
| 11,370,377 B2* | 6/2022 | Schutz | ...................... | B62D 1/04 |
| 2017/0178846 A1* | 6/2017 | Raikar | ............. | B60R 21/01528 |
| 2017/0361801 A1* | 12/2017 | Banno | ................. | B60R 21/2037 |

FOREIGN PATENT DOCUMENTS

| | | | | |
|---|---|---|---|---|
| CN | 215944428 U | * | 3/2022 | |
| DE | 10 2011 118 090 | | 5/2013 | |
| DE | 102017119886 A1 | * | 2/2019 | ......... B60R 21/2037 |
| DE | 10 2018 127 637 | | 5/2020 | |

(Continued)

OTHER PUBLICATIONS

English Language Abstract of KR 10-1998-0042017 published Aug. 17, 1998.

(Continued)

*Primary Examiner* — Nicole T Verley
(74) *Attorney, Agent, or Firm* — DLA Piper LLP (US)

(57) ABSTRACT

Proposed is an apparatus for coupling an airbag module to a steering wheel. A coupling open area extends completely through a steering wheel in a forward-backward direction. A hook extends from a rear portion of an airbag module to behind the steering wheel, and includes a bent portion provided on a distal end to be bent in a direction intersecting a longitudinal direction of the hook. A fixing clip is disposed on a rear portion of the steering wheel and fixed to the steering wheel, with an end of the fixing clip being caught by and coupled to the bent portion of the hook to stop movement of the hook forward of the steering wheel. A catching protrusion protrudes from the rear portion of the steering wheel to catch the end of the fixing clip and stop movement of the fixing clip when the hook is decoupled.

9 Claims, 5 Drawing Sheets

(56) References Cited

FOREIGN PATENT DOCUMENTS

| DE | 202020101931 U1 | * | 5/2020 | ........... B60R 21/203 |
| DE | 202021103776 U1 | * | 9/2021 | ......... B60R 21/2037 |
| JP | 2003-312426 | | 11/2003 | |
| JP | 2007-050876 | | 3/2007 | |
| JP | 2010-116060 | | 5/2010 | |
| JP | 2017222281 A | * | 12/2017 | ............. B60Q 5/003 |
| JP | 2018118642 A | * | 8/2018 | |
| KR | 10-1998-0042017 | | 8/1998 | |
| WO | WO-2011108360 A1 | * | 9/2011 | ......... B60R 21/2037 |
| WO | WO-2016166915 A1 | * | 10/2016 | ........... B60R 21/203 |

OTHER PUBLICATIONS

German Office Action dated Feb. 16, 2022 issued in DE 10 2021 133 479.9.

Korean Office Action dated Mar. 10, 2023 issued in KR 10-2021-0113929.

* cited by examiner

APPARATUS FOR COUPLING AIRBAG MODULE TO STEERING WHEEL

CROSS REFERENCE TO RELATED APPLICATION

The present application claims priority to Korean Patent Application No. 10-2021-0113929, filed Aug. 27, 2021, the entire contents of which are incorporated herein for all purposes by this reference.

BACKGROUND OF THE INVENTION

Field of the Invention

The present invention relates generally to an apparatus for coupling an airbag module to a steering wheel.

Description of the Related Art

An airbag module is a part of a vehicle occupant control system. For example, the airbag module may be disposed inside a steering wheel to improve occupant protection. In addition, the airbag module may be used to generate a horn signal.

These days, it is typical to fasten an airbag module to a steering wheel by a locking connection such that the airbag module and the steering wheel may be easily fitted to each other without use of a complicated screw connection.

However, when the airbag module is disconnected from the steering wheel under pressure generated when an airbag cushion is deployed.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to prevent an airbag module coupled to a steering wheel from being decoupled from the steering wheel by deployment force of an airbag cushion and, when a mechanic or the like attempts to decouple the airbag module from the steering wheel, allow the airbag module to be conveniently decoupled from the steering wheel.

In order to achieve the above objective, according to one aspect of the present invention, there is provided an apparatus for coupling an airbag module to a steering wheel. The apparatus may include: a coupling open area extending completely through a steering wheel in a forward-backward direction; a hook extending from a rear portion of an airbag module to behind the steering wheel, and including a bent portion provided on a distal end to be bent in a direction intersecting a longitudinal direction of the hook; and a fixing clip disposed on a rear portion of the steering wheel and fixed to the steering wheel, with an end of the fixing clip being caught by and coupled to the bent portion of the hook to stop movement of the hook forward of the steering wheel. A catching protrusion may protrude from the rear portion of the steering wheel to catch the end of the fixing clip and stop movement of the fixing clip when the hook is decoupled.

The hook may include a pair of hooks disposed on both sides of a central portion of the steering wheel to be spaced apart from each other in a transverse direction of a vehicle. A central portion of the fixing clip may be bent such that one end and the other end of the fixing clip are spread in opposite directions by elasticity and coupled to the hooks, respectively.

A fixing portion configured to fix the bent central portion of the fixing clip may be provided on the steering wheel.

The steering wheel may include a horn plate on which the airbag module is disposed, a fixing hole 210a may be provided in the horn plate, and the fixing clip may be coupled to the horn plate.

The apparatus may further include a clip holder provided integrally with the horn plate and located adjacent to the coupling open area, wherein the fixing clip is coupled to the clip holder.

The clip holder may have a limitation hole into which an end of the fixing clip is inserted. The limitation hole may be configured to limit a distance to which the end of the fixing clip moves. The catching protrusion may protrude inside the limitation hole.

The limitation hole may include an indentation indented in a portion facing the catching protrusion, the indentation being configured to allow the end of the fixing clip to move over the catching protrusion.

The horn plate may include a support rib extending in a direction in which the hook extends to be in contact with an outer side surface of the clip holder.

The apparatus may further include: a through-holes provided in the steering wheel above a positions in which the end of the fixing clip is fixed to the catching protrusion; and a separation protrusion extending backward from the airbag module through the through-hole and configured to be in contact with the end of the fixing clip and separate the end of the fixing clip from the catching protrusion when the airbag module moves toward the steering wheel.

The end of the separation protrusion may be inclined toward the catching protrusion of the fixing clip.

A limitation protrusion may be provided on the steering wheel to protrude from a portion of the fixing hole 210a above the hook. The limitation protrusion may be configured to limit movement of the end of the fixing clip toward the hook.

In the apparatus for coupling an airbag module to a steering wheel according to the present invention, the fixing clip configured to the rear portion of the steering wheel is provided, the steering wheel has the coupling open areas extending therethrough, and the hooks extending from the rear portion of the airbag module are fixed by the fixing clip after having been inserted into the coupling open areas. In this manner, the airbag module is fixed to the steering wheel. The catching protrusions protrude from the rear portion of the steering wheel to fix the fixing clip when the fixing clip is separated from the hooks, thereby allowing the airbag module to be easily detached from the steering wheel.

In addition, the through-holes are provided above the catching protrusions, and the separation protrusions are provided on the rear portion of the airbag module. When a new airbag module is coupled to the steering wheel, the hooks are inserted into the coupling open areas and, at the same time, the separation protrusions separate the fixing clip from the catching protrusions to move toward the hooks. In this manner, the new airbag module can be easily coupled to the steering wheel.

BRIEF DESCRIPTION OF THE DRAWINGS

The above and other objectives, features, and other advantages of the present invention will be more clearly under

DETAILED DESCRIPTION OF THE INVENTION

Figure 1:
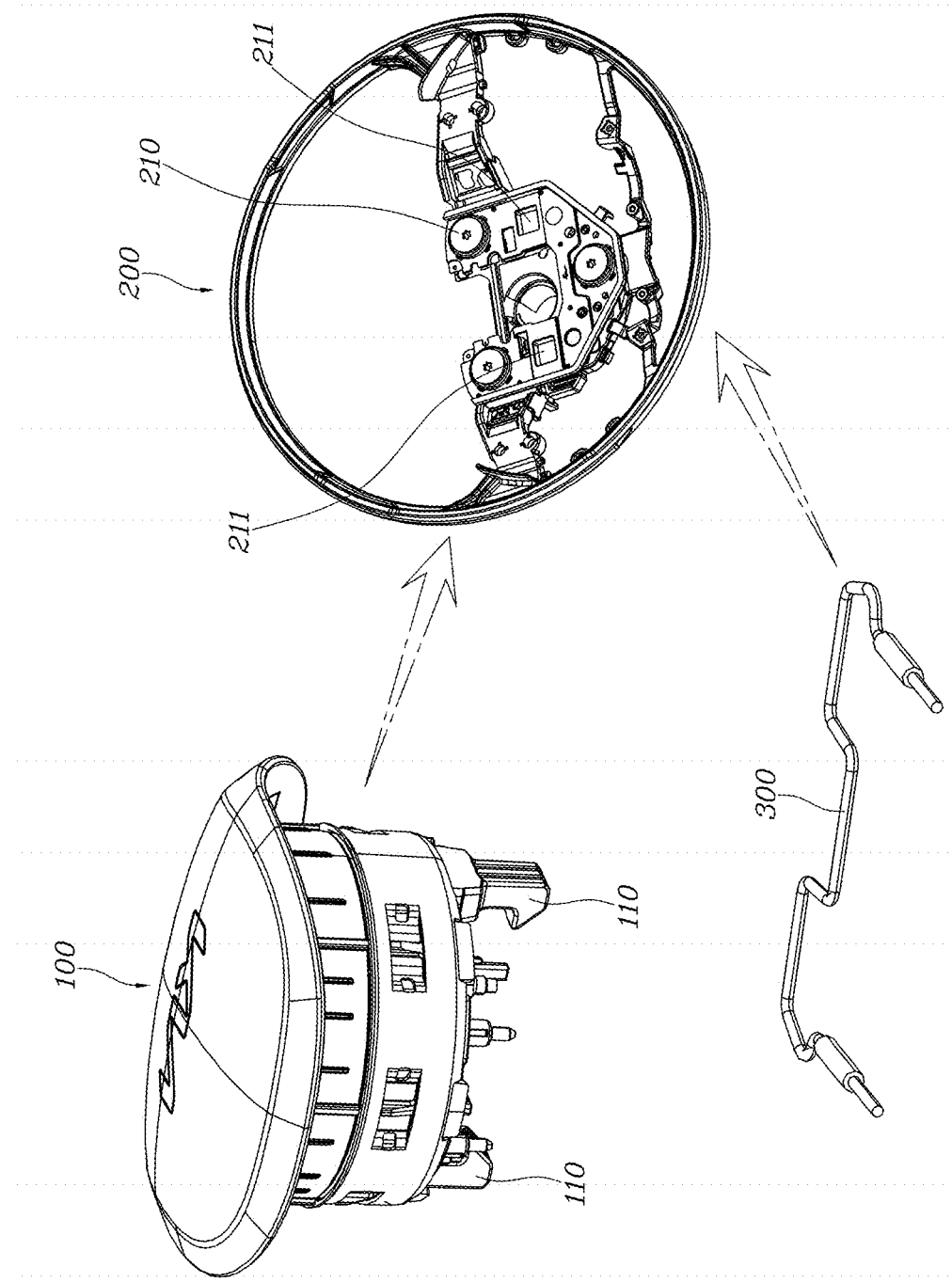
- FIG. 1 is an exploded perspective view illustrating an apparatus for coupling an airbag module to a steering wheel according to an embodiment of the present invention.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Hereinafter, exemplary embodiments of the present invention will be described in detail with reference to the accompanying drawings. Throughout the drawings, the same reference numerals will refer to the same or like parts.

Figure 2:
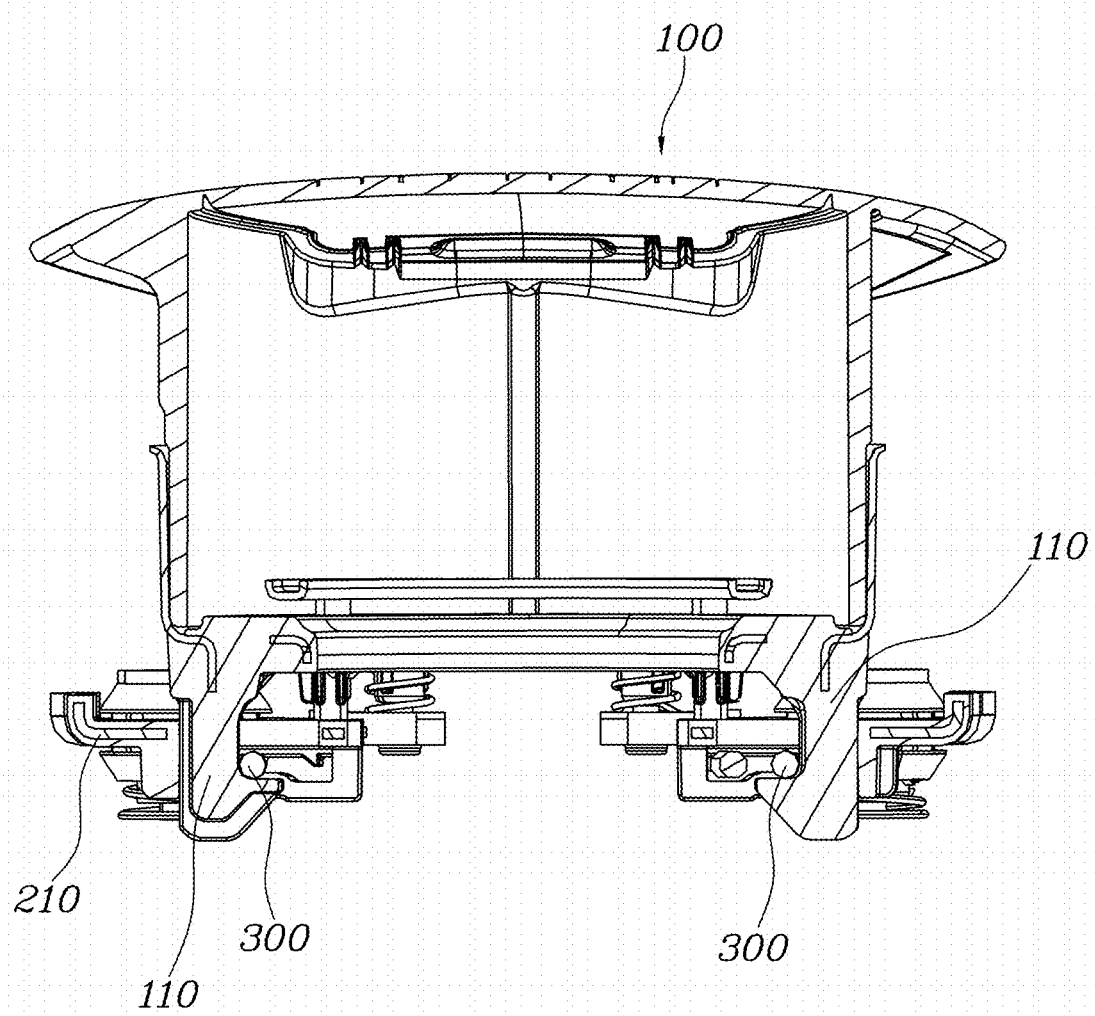
FIG. 2 is a cross-sectional view illustrating the apparatus for coupling an airbag module to a steering wheel according to an embodiment of the present invention.
Figure 3:
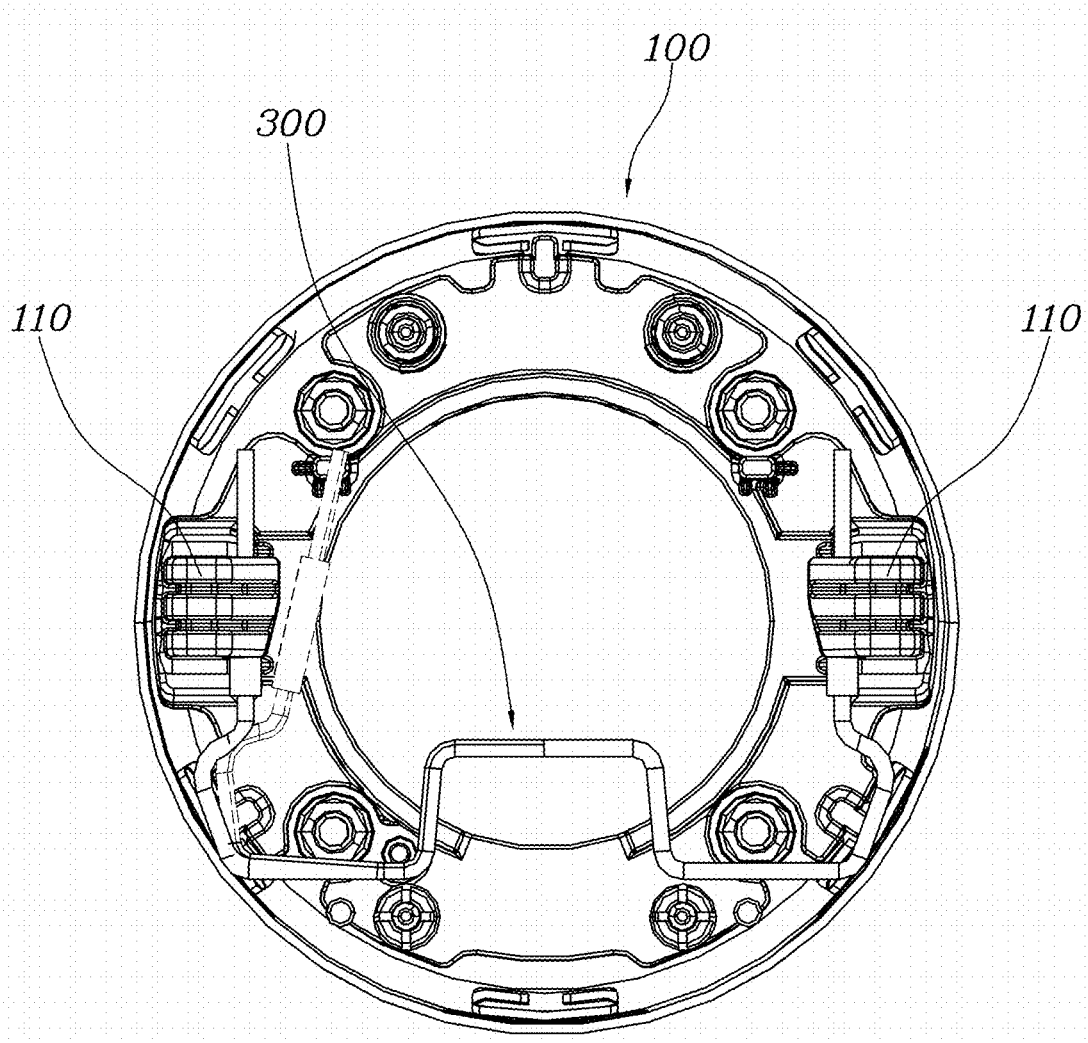
FIG. 3 is a rear view illustrating a coupled state of the airbag module and the fixing clip in the apparatus for coupling an airbag module to a steering wheel according to an embodiment of the present invention.
Figure 4:
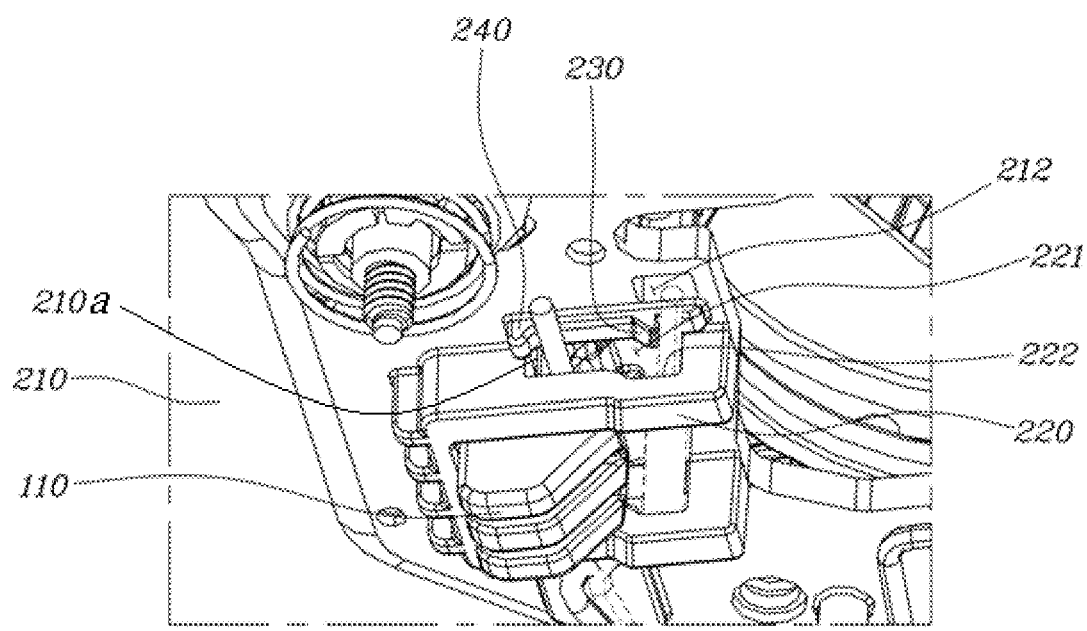
FIG. 4 is a view illustrating the operation of the fixing clip of the apparatus for coupling an airbag module to a steering wheel according to an embodiment of the present invention.
Figure 5:
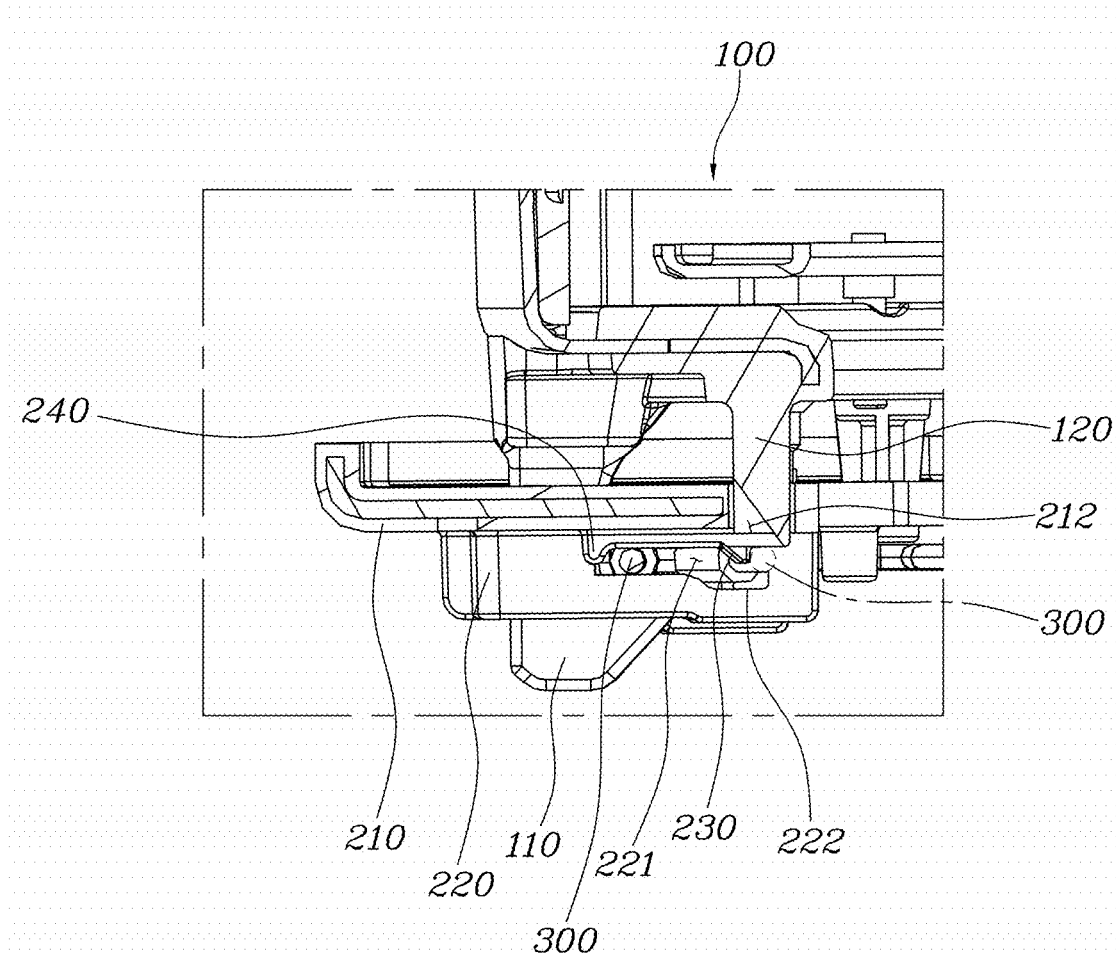
FIG. 5 is a view illustrating the operation of the separation protrusion of the apparatus for coupling an airbag module to a steering wheel according to an embodiment of the present invention.

FIG. 1 is an exploded perspective view illustrating an apparatus for coupling an airbag module 100 to a steering wheel according to an embodiment of the present invention, FIG. 2 is a cross-sectional view illustrating the apparatus for coupling the airbag module 100 to the steering wheel 200 according to an embodiment of the present invention, FIG. 3 is a rear view illustrating a coupled state of the airbag module 100 and a fixing clip 300 in the apparatus for coupling the airbag module 100 to the steering wheel 200 according to an embodiment of the present invention, FIG. 4 is a view illustrating the operation of the fixing clip 300 of the apparatus for coupling the airbag module 100 to the steering wheel 200 according to an embodiment of the present invention, and FIG. 5 is a view illustrating the operation of a separation protrusion 120 of the apparatus for coupling the airbag module 100 to the steering wheel 200 according to an embodiment of the present invention.

As illustrated in FIGS. 1 to 5, an exemplary embodiment of the apparatus for coupling the airbag module 100 to the steering wheel 200 according to the present invention will be described.

An airbag may be disposed on the driver's seat side of a vehicle in order to protect a driver. The airbag may be implemented as the airbag module 100 including a housing in which an airbag cushion is stored and an inflator injecting gas into the airbag cushion. The airbag cushion is disposable, and after the airbag cushion is deployed, the entirety of the airbag module 100 must be replaced.

Thus, the airbag module 100 provided on the driver's seat side is coupled to the steering wheel 200 of the vehicle, and is required to be easily coupled to and decoupled from the steering wheel 200.

The apparatus for coupling the airbag module 100 to the steering wheel 200 according to the present invention was conceived to facilitate attachment and detachment of the airbag module 100 to and from the steering wheel 200.

The apparatus for coupling the airbag module 100 to the steering wheel 200 according to the present invention is an apparatus for mounting the airbag module 100 on the steering wheel 200 and in front of the steering wheel 200. The coupling apparatus may include: coupling open areas 211 extending completely through the steering wheel 200 in the forward-backward direction; hooks 110 extending from the rear portion of the airbag module 100 to behind the steering wheel 200, each of the hooks 110 including a bent portion provided on the distal end to be bent in a direction intersecting the longitudinal direction (i.e., the direction of extension) of the hook 110; and the fixing clip 300 disposed on the rear portion of the steering wheel 200 and fixed to the steering wheel 200, with ends of the fixing clip 300 being caught by and coupled to the bent portions of the hooks 110 to stop movement of the hooks 110 forward of the steering wheel 200. Catching protrusions 230 protrude from the rear portion of the steering wheel 200 to catch the ends of the fixing clip 300 and stop movement of the fixing clip 300 when the hooks 110 are decoupled.

The airbag module 100 may be coupled to the central front portion of the steering wheel 200. The hooks 110 may extend from the rear portion of the airbag module 100 toward the steering wheel 200, with distal ends thereof being bent in the direction intersecting the direction of extension.

In an embodiment of the hooks 110, the hooks may be bent in directions toward the central portion of the steering wheel 200.

When the coupling open areas 211 are formed to extend through the steering wheel 200, the coupling open areas 211 may be disposed to correspond to positions in which the hooks 110 are formed. Thus, when the airbag module is coupled to the steering wheel 200, the hooks 110 may be inserted into the coupling open areas 211.

The fixing clip 300 may be coupled to the rear portion of the steering wheel 200 and have elastic force generated on the end side in the direction opposite to the direction in which the hooks 110 are bent in order to fix the hooks 110 after the hooks 110 are inserted into the coupling open areas 211. The fixing clip 300 may be inserted into the bent portions of the hooks 110 to fix the hooks 110.

Afterwards, since the airbag module 100 is disposable and thus must be replaced after use, when the airbag module 100 is to be detached from the steering wheel 200, the fixing clip 300 must be detached from the hooks 110. Here, the steering wheel 200 may have the catching protrusions 230 protruding from the rear portion to fix the fixing clip 300 when attempting to detach the fixing clip 300 from the hooks 110 by moving the fixing clip 300 toward the central portion of the steering wheel 200 and remove the hooks 110 from the open areas into which the hooks 110 are inserted. The ends of the fixing clip 300 may be moved toward the catching protrusions 230 to be caught and fixed by the catching protrusions 230. Thus, a mechanic may easily detach the airbag module 100 from the steering wheel 200.

The hooks 110 are a pair of hooks located on both sides of the central portion of the steering wheel 200 and spaced apart from each other in the transverse direction of the vehicle. The central portion of the fixing clip 300 is bent such that one end and the other end of the fixing clip 300 may be spread in opposite directions by elasticity and coupled to the hooks 110 of the hook pair, respectively.

As illustrated in FIGS. 1 to 5, the pair of hooks 110 may be provided on both sides of the central portion of the steering wheel 200 to be spaced apart from each other in the transverse direction of the vehicle. The coupling open areas 211 may also be a pair of coupling open areas formed in positions corresponding to the hooks 110, thereby allowing the hooks 110 to be inserted into the coupling open areas 211, respectively. In addition, the central portion of the fixing clip 300 is bent toward both ends such that the both ends may be inserted into the bent portions of the hooks 110 while applying elastic force toward the hooks 110, thereby fixing the hooks 110.

The fixing clip 300 drawn with dotted lines in FIGS. 4 and 5 indicate the position to which the fixing clip 300 drawn with solid lines has move toward the catching protrusions 230 after having been detached from the hooks 110.

Consequently, even when the steering wheel 200 is turned to steer the vehicle, the airbag module 100 coupled to the steering wheel 200 can be firmly supported.

The steering wheel 200 may include a fixing portion (not shown) fixing the bent central portion of the fixing clip 300.

The fixing clip 300 is provided in the shape of a wire bent with respect to the central portion such that the both ends have elasticity. The central portion of the fixing clip 300 may be coupled to the steering wheel 200.

Here, the fixing portion (not shown) may be provided on the rear portion of the steering wheel 200 to fix the bent central portion of the fixing clip 300 and open the fixing clip 300 such that the both ends may have elasticity.

The steering wheel 200 includes a horn plate 210 on which the airbag module 100 is mounted. The horn plate 210 may have a fixing hole 210a, and the fixing clip 300 may be coupled to the horn plate 210.

The steering wheel 200 may be provided with a rim that the driver may grasp, and the horn plate 210 may connect the rim and the vehicle and form the base of the steering wheel 200.

The coupling open areas 211 may be provided in the horn plate 210. The airbag module 100 may be coupled to the horn plate 210 through the coupling open areas 211 so as to be rapidly deployed in front of the driver at a collision.

In addition, as the airbag module 100 is coupled to the horn plate 210 provided on the central portion of the steering wheel 200, inertial force applied to the airbag module 100 by rotation of the steering wheel 200 may be reduced, and thus, the driver may easily turn the steering wheel 200.

Clip holders 220 provided integrally with the horn plate 210 may also be provided. The clip holders 220 may be located adjacent to the coupling open areas 211, and the fixing clip 300 may be coupled to the clip holders 220.

The clip holders 220 may be provided behind the horn plate 210 and adjacently to the coupling open areas 211 in order to locate the fixing clip 300 in a position adjacent to the coupling open areas 211 before the ends of the fixing clip 300 are coupled to the hooks 110.

Consequently, the clip holders 220 can support the ends of the fixing clip 300 and directly input the ends of the fixing clip 300 into the hooks 110 when the hooks 110 are inserted into the coupling open areas 211, thereby improving the efficiency of work of a mechanic.

Each of the clip holders 220 may have a limitation hole 221 into which a corresponding one of the ends of the fixing clip 300 is inserted. The limitation hole 221 is configured to limit the distance to which the end of the fixing clip 300 moves. The catching protrusions 230 may protrude inside the limitation holes 221.

The fixing clip 300 may be located adjacently to the coupling open areas 211 through the clip holders 220. When the hooks 110 are inserted into the coupling open areas 211, the ends of the fixing clip 300 must be moved toward the central portion of the steering wheel 200. Here, to minimize the movement of the ends of the fixing clip 300, each of the clip holders 220 has the limitation hole 221 limiting the movement of the fixing clip 300. The ends of the clip holders 220 are movable within the limitation holes 221.

Afterwards, when the airbag module 100 is detached from the steering wheel 200, the ends of the fixing clip 300 must be moved. The moved ends of the clip holders 220 may be moved within the limitation holes 221 and be fixed by the catching protrusions 230 protruding inside the limitation holes 221.

Consequently, when a mechanic couples or decouples the airbag module 100 to or from the steering wheel 200, the efficiency of work can be improved.

The limitation hole 221 may include an indentation 222 indented in a portion facing a corresponding one of the catching protrusions 230. The indentations 222 serve to allow the ends of the fixing clip 300 to move over the catching protrusions 230, respectively.

In a case in which the ends of the fixing clip 300 move toward the catching protrusions 230 in the limitation holes 221 or move toward the hooks 110 while caught by the catching protrusions 230, when the limitation holes 221 have a related-art size, it may be difficult for the ends of the fixing clip 300 to move due to the provision of the catching protrusions 230.

In preparation for this, the limitation holes 221 may have the indentations 222 indented in the positions facing the catching protrusions 230. Thus, the ends of the fixing clip 300 may be caught by and coupled to the catching protrusions 230 through the indentations 222 or be detached from the catching protrusions 230 through the indentations 222.

The coupling apparatus may further include: through-holes 212 provided in the steering wheel 200 above the positions in which the ends of the fixing clip 300 are fixed to the catching protrusions 230; and separation protrusions 120 extending backward from the airbag module 100 through the through-holes 212 and configured to be in contact with the ends of the fixing clip 300 and separate the ends of the fixing clip 300 from the catching protrusions 230 when the airbag module 100 moves toward the steering wheel 200.

When the airbag cushion is decoupled from the steering wheel, the ends of the fixing clip 300 may be moved toward the catching protrusions 230 to be caught and fixed by the catching protrusions 230.

Afterwards, when the airbag module 100 is replaced with a new airbag module 100 and the new airbag module 100 is coupled to the steering wheel 200, the ends of the fixing clip 300 must be separated from the catching protrusions 230 and be moved toward the hooks 110 to be coupled to the hooks 110. Here, the through-holes 212 may be formed in the steering wheel 200 in positions above the catching protrusions 230 to extend through the steering wheel 200. The separation protrusions 120 may extend from the rear portion of the airbag module 100 so as to be inserted into the through-holes 212.

The separation protrusions 120 may cause the fixing clip 300 to be caught by and coupled to the hooks 110 by separating the fixing clip 300 from the catching protrusions 230 while pushing the ends of the fixing clip 300, caught by and coupled to the catching protrusions 230, toward the indentations 222.

Consequently, a mechanic is relieved from the operation of separating the fixing clip 300 from the catching protrusions 230, and thus, the efficiency and convenience of the operation may be improved.

The ends of the separation protrusions 120 may be inclined toward the catching protrusions 230 of the fixing clip.

As illustrated in FIG. 5, the catching protrusions may be inclined toward the hooks 110, respectively. Due to the catching protrusions, the ends of the fixing clip 300, caught by and coupled to the catching protrusions 230, may be smoothly separated from the catching protrusions 230, and thus, may be smoothly moved toward the hooks 110.

The steering wheel 200 may include a limitation protrusion 240 protruding from a portion of the fixing hole 210a above the corresponding hook 110. The limitation protrusion 240 may limit movement of the corresponding end of the fixing clip 300 toward the corresponding hook 110.

The limitation protrusion 240 protrudes from the portion above the fixing hole 210a and into which the corresponding hook 110 is inserted. When the fixing clip 300 is inserted into the hooks 110, the ends of the fixing clip 300 may protrude above the hooks 110 and be in contact with outer portions of the fixing clip 300.

Consequently, when the end of the fixing clip 300 elastically moves toward the hooks 110 because of a mistake of a mechanic, the end of the fixing clip 300 may come into contact with the limitation protrusion 240, thereby preventing the hook 110 from being fractured by the fixing clip 300.

Although the specific embodiments of the present invention have been described for illustrative purposes, those skilled in the art will appreciate that various modifications, additions, and substitutions are possible, without departing from the scope and spirit of the present invention as disclosed in the accompanying claims.

What is claimed is:

1. An apparatus for coupling an airbag module to a steering wheel, the apparatus comprising:
   a coupling open area extending completely through the steering wheel in a forward-backward direction;
   a hook extending from a rear portion of the airbag module to behind the steering wheel, and comprising a bent portion provided on a distal end to be bent in a direction intersecting a longitudinal direction of the hook; and
   a fixing clip disposed on the rear portion of the steering wheel and fixed to the steering wheel, with an end of the fixing clip being caught by and coupled to the bent portion of the hook to stop movement of the hook forward of the steering wheel,
   wherein a catching protrusion protrudes from the rear portion of the steering wheel to catch the end of the fixing clip and stop movement of the fixing clip when the hook is decoupled, and
   wherein a limitation protrusion is provided on the steering wheel to protrude from a portion of a fixing hole above the hook, the limitation protrusion being configured to limit movement of the end of the fixing clip toward the hook.

2. The apparatus according to claim 1, wherein the hook comprises a pair of hooks disposed on both sides of a central portion of the steering wheel to be spaced apart from each other in a transverse direction of a vehicle, and
   a central portion of the fixing clip is bent such that one end and an other end of the fixing clip are spread in opposite directions by elasticity and coupled to the hooks, respectively.

3. The apparatus according to claim 2, wherein a fixing portion configured to fix the bent central portion of the fixing clip is provided on the steering wheel.

4. The apparatus according to claim 1, wherein the steering wheel comprises a horn plate on which the airbag module is disposed, and the fixing hole is provided in the horn plate, and the fixing clip is coupled to the horn plate.

5. The apparatus according to claim 4, further comprising a clip holder provided integrally with the horn plate and located adjacent to the coupling open area, wherein the fixing clip is coupled to the clip holder.

6. The apparatus according to claim 5, wherein the clip holder has a limitation hole into which the end of the fixing clip is inserted, the limitation hole being configured to limit a distance to which the end of the fixing clip moves, and the catching protrusion protrudes inside the limitation hole.

7. The apparatus according to claim 6, wherein the limitation hole comprises an indentation indented in a portion facing the catching protrusion, the indentation being configured to allow the end of the fixing clip to move over the catching protrusion.

8. An apparatus for coupling an airbag module to a steering wheel, the apparatus comprising:
- a coupling open area extending completely through the steering wheel in a forward-backward direction;
- a hook extending from a rear portion of the airbag module to behind the steering wheel, and comprising a bent portion provided on a distal end to be bent in a direction intersecting a longitudinal direction of the hook;
- a fixing clip disposed on the rear portion of the steering wheel and fixed to the steering wheel, with an end of the fixing clip being caught by and coupled to the bent portion of the hook to stop movement of the hook forward of the steering wheel, wherein a catching protrusion protrudes from the rear portion of the steering wheel to catch the end of the fixing clip and stop movement of the fixing clip when the hook is decoupled;
- a through-hole provided in the steering wheel above a position in which the end of the fixing clip is fixed to the catching protrusion; and
- a separation protrusion extending backward from the airbag module through the through-hole and configured to be in contact with the end of the fixing clip and separate the end of the fixing clip from the catching protrusion when the airbag module moves toward the steering wheel.

9. The apparatus according to claim 8, wherein the end of the separation protrusion is inclined toward the catching protrusion of the fixing clip.

\* \* \* \* \*